US007331863B2

(12) United States Patent
Baerlocher

(10) Patent No.: US 7,331,863 B2
(45) Date of Patent: Feb. 19, 2008

(54) GAMING DEVICE HAVING RELATED AWARD COMPONENT SELECTION

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 165 days.

(21) Appl. No.: 10/644,296

(22) Filed: Aug. 20, 2003

(65) Prior Publication Data

US 2005/0043081 A1 Feb. 24, 2005

(51) Int. Cl.
*A63F 9/00* (2006.01)
*A63F 13/00* (2006.01)

(52) U.S. Cl. .............................. 463/20; 463/1; 463/16; 463/22; 273/138.1

(58) Field of Classification Search ............ 463/16–20, 463/30–34, 42, 46, 1, 22
See application file for complete search history.

(56) References Cited

U.S. PATENT DOCUMENTS

| | | | | |
|---|---|---|---|---|
| 3,633,915 | A * | 1/1972 | Lippert | 273/274 |
| 4,448,419 | A | 5/1984 | Telnaes | |
| 4,560,161 | A | 12/1985 | Hamano | |
| 4,624,459 | A | 11/1986 | Kaufman | |
| 4,695,053 | A | 9/1987 | Vazquez, Jr. et al. | |
| 4,775,155 | A | 10/1988 | Lees | |
| 4,838,552 | A | 6/1989 | Hagiwara | |
| 5,092,598 | A | 3/1992 | Kamille | |
| 5,205,555 | A | 4/1993 | Hamano | |
| 5,324,041 | A | 6/1994 | Boylan et al. | |
| 5,342,047 | A | 8/1994 | Heidel et al. | |
| 5,401,024 | A | 3/1995 | Simunek | |
| 5,449,173 | A | 9/1995 | Thomas et al. | |
| 5,511,781 | A | 4/1996 | Wood et al. | |
| 5,531,441 | A | 7/1996 | Dabrowski et al. | |
| 5,536,016 | A | 7/1996 | Thompson | |
| 5,542,669 | A | 8/1996 | Charron et al. | |
| 5,560,603 | A | 10/1996 | Seelig et al. | |
| 5,584,763 | A | 12/1996 | Kelly et al. | |
| 5,584,764 | A | 12/1996 | Inoue | |

(Continued)

FOREIGN PATENT DOCUMENTS

DE 19600787 5/1997

(Continued)

OTHER PUBLICATIONS

Addams Family Article written by Strictly Slots, published in 2000.

(Continued)

*Primary Examiner*—Xuan M. Thai
*Assistant Examiner*—Meagan Thomasson
(74) *Attorney, Agent, or Firm*—Bell, Boyd & Lloyd LLP

(57) ABSTRACT

A primary or secondary game is provided for a wagering gaming device. The game includes a display of a plurality of values. The display associates a set of multipliers with each of the values. One of the values is generated randomly for the player. That generation also designates the set of multipliers associated with the generated value. One of the multipliers from the designated set is then generated. The designated value and multiplier form an award that is provided to a player.

89 Claims, 7 Drawing Sheets

U.S. PATENT DOCUMENTS

| | | | |
|---|---|---|---|
| 5,611,535 A | 3/1997 | Tiberio | |
| 5,647,798 A | 7/1997 | Falciglia | |
| 5,722,891 A | 3/1998 | Inoue | |
| 5,766,074 A | 6/1998 | Cannon et al. | |
| 5,769,716 A | 6/1998 | Saffari et al. | |
| 5,772,509 A | 6/1998 | Weiss | |
| 5,788,573 A | 8/1998 | Baerlocher et al. | |
| 5,823,874 A | 10/1998 | Adams | |
| 5,848,932 A | 12/1998 | Adams | |
| 5,851,148 A | 12/1998 | Brune et al. | |
| 5,882,261 A | 3/1999 | Adams | |
| 5,911,418 A | 6/1999 | Adams | |
| 5,919,091 A | 7/1999 | Bell et al. | |
| 5,927,714 A | 7/1999 | Kaplan | |
| 5,931,467 A | 8/1999 | Kamille | |
| 5,935,002 A | 8/1999 | Falciglia | |
| 5,947,820 A | 9/1999 | Morro et al. | |
| 5,951,397 A | 9/1999 | Dickinson | |
| 5,964,463 A | 10/1999 | Moore, Jr. | |
| 5,980,384 A | 11/1999 | Barrie | |
| 5,988,643 A | 11/1999 | Awada | |
| 5,996,997 A | 12/1999 | Kamille | |
| 5,997,401 A | 12/1999 | Crawford | |
| 6,004,207 A | 12/1999 | Wilson, Jr. et al. | |
| 6,015,346 A | 1/2000 | Bennett | |
| 6,019,374 A | 2/2000 | Breeding | |
| 6,056,642 A | 5/2000 | Bennett | |
| 6,059,289 A | 5/2000 | Vancura | |
| 6,059,658 A | 5/2000 | Mangano et al. | |
| 6,062,980 A | 5/2000 | Luciano | |
| 6,089,976 A | 7/2000 | Schneider et al. | |
| 6,089,977 A | 7/2000 | Bennett | |
| 6,089,978 A | 7/2000 | Adams | |
| 6,102,798 A | 8/2000 | Bennett | |
| 6,105,962 A | 8/2000 | Malavazos et al. | |
| 6,120,031 A | 9/2000 | Adams | |
| 6,126,542 A | 10/2000 | Fier | |
| 6,129,355 A | 10/2000 | Hahn et al. | |
| 6,135,885 A | 10/2000 | Lermusiaux | |
| 6,142,873 A * | 11/2000 | Weiss et al. | 463/20 |
| 6,149,156 A | 11/2000 | Feola | |
| 6,149,521 A | 11/2000 | Sanduski | |
| 6,159,095 A | 12/2000 | Frohm et al. | |
| 6,159,096 A | 12/2000 | Yoseloff | |
| 6,159,097 A | 12/2000 | Gura | |
| 6,159,098 A | 12/2000 | Slomiany et al. | |
| 6,162,121 A | 12/2000 | Morro et al. | |
| 6,164,652 A | 12/2000 | Lauretta et al. | |
| 6,168,520 B1 * | 1/2001 | Baerlocher et al. | 463/16 |
| 6,173,955 B1 | 1/2001 | Perrie et al. | |
| 6,174,235 B1 | 1/2001 | Walker et al. | |
| 6,190,254 B1 | 2/2001 | Bennett | |
| 6,190,255 B1 | 2/2001 | Thomas et al. | |
| 6,203,429 B1 | 3/2001 | Demar et al. | |
| 6,224,483 B1 | 5/2001 | Mayeroff | |
| 6,227,969 B1 | 5/2001 | Yoseloff | |
| 6,227,971 B1 | 5/2001 | Weiss | |
| 6,231,442 B1 | 5/2001 | Mayeroff | |
| 6,231,445 B1 | 5/2001 | Acres | |
| 6,234,897 B1 | 5/2001 | Frohm et al. | |
| 6,254,481 B1 | 7/2001 | Jaffe | |
| 6,261,177 B1 | 7/2001 | Bennett | |
| 6,270,412 B1 | 8/2001 | Crawford et al. | |
| 6,290,600 B1 | 9/2001 | Glasson | |
| 6,296,568 B1 | 10/2001 | Tracy | |
| 6,299,165 B1 | 10/2001 | Nagano | |
| 6,305,686 B1 | 10/2001 | Perrie et al. | |
| 6,309,300 B1 | 10/2001 | Glavich | |
| 6,312,334 B1 | 11/2001 | Yoseloff | |
| 6,315,660 B1 | 11/2001 | DeMar et al. | |
| 6,315,663 B1 | 11/2001 | Sakamoto | |
| 6,315,664 B1 | 11/2001 | Baerlocher et al. | |
| 6,319,123 B1 | 11/2001 | Paludi | |
| 6,319,124 B1 | 11/2001 | Baerlocher et al. | |
| 6,322,309 B1 | 11/2001 | Thomas et al. | |
| 6,334,814 B1 | 1/2002 | Adams | |
| 6,336,860 B1 | 1/2002 | Webb | |
| 6,336,863 B1 | 1/2002 | Baerlocher et al. | |
| 6,338,678 B1 | 1/2002 | Seelig et al. | |
| 6,346,043 B1 | 2/2002 | Colin et al. | |
| 6,347,996 B1 | 2/2002 | Gilmore et al. | |
| 6,364,766 B1 | 4/2002 | Anderson et al. | |
| 6,364,767 B1 | 4/2002 | Brossard et al. | |
| 6,375,187 B1 | 4/2002 | Baerlocher | |
| 6,413,161 B1 | 7/2002 | Baerlocher et al. | |
| 6,439,995 B1 | 8/2002 | Hughs-Baird et al. | |
| 6,443,837 B1 | 9/2002 | Jaffe et al. | |
| 6,450,884 B1 | 9/2002 | Seelig et al. | |
| 6,461,241 B1 | 10/2002 | Webb et al. | |
| 6,464,582 B1 | 10/2002 | Baerlocher et al. | |
| 6,494,785 B1 | 12/2002 | Gerrard et al. | |
| 6,506,118 B1 | 1/2003 | Baerlocher et al. | |
| 6,508,707 B2 | 1/2003 | DeMar et al. | |
| 6,511,375 B1 | 1/2003 | Kaminkow | |
| 6,514,141 B1 | 2/2003 | Kaminkow et al. | |
| 6,533,273 B2 * | 3/2003 | Cole et al. | 273/138.1 |
| 6,533,660 B2 | 3/2003 | Seelig et al. | |
| 6,537,152 B2 * | 3/2003 | Seelig et al. | 463/30 |
| 6,554,704 B2 | 4/2003 | Nicastro et al. | |
| 6,561,904 B2 * | 5/2003 | Locke et al. | 463/25 |
| 6,569,015 B1 | 5/2003 | Baerlocher et al. | |
| 6,569,016 B1 | 5/2003 | Baerlocher | |
| 6,572,473 B1 | 6/2003 | Baerlocher | |
| 6,575,830 B2 | 6/2003 | Baerlocher et al. | |
| 6,582,307 B2 * | 6/2003 | Webb | 463/22 |
| 6,585,591 B1 | 7/2003 | Baerlocher et al. | |
| 6,595,854 B2 | 7/2003 | Hughs-Baird et al. | |
| 6,599,185 B1 | 7/2003 | Kaminkow et al. | |
| 6,599,192 B1 | 7/2003 | Baerlocher et al. | |
| 6,602,135 B1 | 8/2003 | Gerrard | |
| 6,602,137 B2 | 8/2003 | Kaminkow et al. | |
| 6,607,437 B2 | 8/2003 | Casey et al. | |
| 6,609,972 B2 | 8/2003 | Seelig et al. | |
| 6,632,141 B2 | 10/2003 | Webb et al. | |
| 6,634,945 B2 | 10/2003 | Glavich et al. | |
| 6,656,043 B2 | 12/2003 | Seelig et al. | |
| 6,663,489 B2 * | 12/2003 | Baerlocher | 463/20 |
| 6,688,977 B1 | 2/2004 | Baerlocher et al. | |
| 6,712,694 B1 | 3/2004 | Nordman | |
| 2002/0025844 A1 | 2/2002 | Casey et al. | |
| 2002/0045475 A1 | 4/2002 | Glavich et al. | |
| 2002/0065126 A1 * | 5/2002 | Miller et al. | 463/20 |
| 2002/0072402 A1 | 6/2002 | Baerlocher | |
| 2002/0142822 A1 | 10/2002 | Baerlocher et al. | |
| 2002/0151350 A1 | 10/2002 | Baerlocher et al. | |
| 2002/0155883 A1 | 10/2002 | Baerlocher | |
| 2003/0013514 A1 | 1/2003 | Cregan et al. | |
| 2003/0040355 A1 | 2/2003 | Baerlocher | |
| 2003/0040360 A1 | 2/2003 | Kaminkow | |
| 2003/0045344 A1 | 3/2003 | Webb et al. | |
| 2003/0045348 A1 | 3/2003 | Palmer et al. | |
| 2003/0045350 A1 | 3/2003 | Baerlocher et al. | |
| 2003/0064795 A1 | 4/2003 | Baerlocher et al. | |
| 2003/0119583 A1 | 6/2003 | Kaminkow et al. | |
| 2003/0162584 A1 | 8/2003 | Hughs-Baird et al. | |
| 2003/0195027 A1 | 10/2003 | Baerlocher et al. | |
| 2004/0002372 A1 | 1/2004 | Rodgers et al. | |
| 2004/0043811 A1 * | 3/2004 | Seelig et al. | 463/16 |

FOREIGN PATENT DOCUMENTS

| | | |
|---|---|---|
| DE | 19613455 | 8/1997 |
| DE | 19936196 | 1/2001 |
| EP | 0945837 A2 | 9/1999 |

| | | |
|---|---|---|
| GB | 2 092 797 | 8/1982 |
| GB | 2 144 644 | 3/1985 |
| GB | 2 201 821 | 9/1988 |
| GB | 2 322 217 | 8/1998 |
| WO | WO 97/32285 | 9/1997 |
| WO | WO 00/12186 | 3/2000 |
| WO | WO 01/34261 A1 | 5/2001 |

OTHER PUBLICATIONS

Austin Powers written by IGT, published in 2001.
Austin Powers Advertisement written by IGT, published in 2001.
Austin Powers in Goldmember™ Advertisement written by IGT, published in 2003.
Catch A Wave Article written by IGT, published in 2000.
Fortune Cookie Advertisement written by IGT, published in 2000.
Magic 8 Ball Advertisement written by IGT, published in 2002.
Monte Carlo Advertisement written by Bally Gaming, published prior to Sep. 12, 2002.
Neon Nights Advertisement written by IGT, published in 2000.
On the Money Article written by Casino Data System, published in 2000.
Price is Right Showcase Showdown, written by IGT, published in 2001.
Slot Machines [In Part] written by Marshal Fey, published in 1997.
Uno Game Description by C. R. Light & Co, published in 1900.
Wheel of Fortune Advertisement written by IGT, published in 1998.
Wheel of Fortune Advertisement written by IGT, published in 1999.
Wheel & Deal Brochure written by Anchor Games, Strictly Slots, published in Dec. 2001.
Wheel Poker Brochure written by Anchor Games/Bally Gaming, Strictly Slots, published prior to Sep. 12, 2002.
Young Frankenstein Advertisement written by IGT, published in 2003.

* cited by examiner

GAMING DEVICE HAVING RELATED AWARD COMPONENT SELECTION

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to gaming devices and more particularly to a gaming device operable to determine an award based on or formed from at least two components and which includes a selection of a first component from a plurality of first components and a selection of a second component from a plurality of second components which are associated with the selected first component.

Gaming device manufacturers provide known gaming machines such as slot machines employing a plurality of reels, wherein the reels each have a plurality of symbols. In those games, the player activates or spins the reels to produce a generation of a combination of symbols. If the generated combination, or a portion of the combination, matches one of a number of predetermined award producing or winning combinations, the player receives an award. The award is commonly one or more credits that the player can use to play further games or redeem for money.

In general, primary games and secondary games of gaming devices that are visually dynamic tend to capture the player's attention and increase the enjoyment and excitement associated with the game. Moreover, games having awards based on multiple components also tend to be popular. For example, primary or secondary games wherein the player makes multiple selections and has multiple opportunities to win or accept an award tend to be fun and exciting. An example of such a game is described in U.S. Pat. No. 6,569,015, entitled, "Gaming Device Having Separately Changeable Value And Modifier Bonus Scheme". In that game, separate value and multiplier components are selected randomly and combined to form an award for the player.

To increase player enjoyment and excitement, gaming device manufacturers constantly strive to make their gaming devices as fun, exciting and attractive as possible. Manufacturers also attempt to provide games that are relatively simple and intuitive. A continuing need therefore exists to provide new and different primary or secondary games for gaming devices that are visually dynamic, intuitive and exciting for players.

SUMMARY OF THE INVENTION

The present invention provides a primary wagering game or secondary game for a gaming device. The game includes a plurality of first components and a plurality of second components. In one embodiment, at least one of the first components and at least one of the second components are selected to determine an outcome such as an award for the player. The game includes a selection of the first component from a plurality of first components. In one embodiment, each of the first components include an association with one or a plurality of the second components. A selection of the second component is from the one or a plurality of second components which are associated with the selected first component. It should be appreciated that in one alternative embodiment, not every first component has an associated second component. In this embodiment, the outcome provided to the player can be based solely on the selected first component if the first component does not have any associated second components.

In one embodiment, two or more of the first components each share or are associated with one or more of the second components. In one embodiment, one or more of the second components are only associated with each one of the first components. It should be appreciated that this mean that the second component could only be associated with a first component, but does not exclude another second component having the same value or meaning. The various possible associations of first and second components in accordance with the present invention will become more evident based on the various embodiments and examples described below.

In one embodiment, the present invention includes at least two determinations. These determinations can be random or performed in another suitable manner. The first determination determines a value (i.e., a first component) from a set of possible values. Each of those possible values have an associated second set of possible modifiers (i.e., second components) associated with that value. The second determination determines a modifier (i.e., a second component) from the set of possible modifiers associated with the determined value or first component. In this embodiment, the result of the second determination cause a modification of the award (or first component) which is selected by the first determination. Also, in one such embodiment, multiple values can have shared modifiers and unshared modifiers. Moreover, in one such embodiment each value (or first component) can share different multipliers with different values. It should be appreciated that the number of second components associated with each of the first components can also vary.

In one embodiment, the gaming device is adapted to display the different award components to a player. The display shows a plurality of value components and the association of the value components with the modifier components in a spatial relationship. More specifically, the display shows the association of a set of modifiers with each of the value components and the modifier components which are shared by the various value components. The display can be electromechanical or simulated. It should be appreciated that alternatively the components can be switched, such that the modifier is the first component and the value is the second component.

In one embodiment, a plurality of the value or first components are different from each other. In one embodiment, a plurality of the modifier or second components are different from each other. Any suitable first and second components may be employed in the present invention, including first and second components of the same or different type.

In one embodiment, the values and multiplier sets are displayed around a globe shaped object or spherical object. The object can be electromechanical or simulated. The object is divided into a plurality of sections. In one embodiment, every other section displays only multiplier values. The section between each pair of these multiplier only sections display a value between two multipliers. In another embodiment, two adjacent sections having only multipliers separate sections having both values and multipliers. In either case, the sections form a series of values surrounded by multipliers. This defines the association of the second components with each of the first components. For instance, the multiplier set for a given value can include those multipliers that surround the value. That set can be referred to as exclusive or unique to the particular value. When the value sections are separated by only a single section of multipliers, each multiplier only section forms a portion of two unique or exclusive sets of multipliers for two separate values. In one embodiment, the overlapping sets are disposed around the spherical object in one embodiment such that each value shares a plurality of multipliers with the value to the left and right of that value. It should be appreciated that the same representation of the first and second components and their associations can be displayed on a flat or other suitable object or display device.

In alternative embodiments, each of the value-containing sections are separated by two or more multiplier only sections, thereby creating sets that do not overlap with each other. In a further alternative embodiment, the values and multipliers are swapped, so that the values form sets that surround the multipliers. It should also be appreciated that the term "multiplier" is used herein to describe one embodiment of the present invention, however, the multiplier can be any type of award modifier or different award or outcome. That is, the modifier does not have to multiply the value, but can instead be added to the value or otherwise operate mathematically with the value.

After forming the award, the gaming device provides the award to the player as either part of a primary game or secondary game. If a secondary game, the player returns to primary game play with an increased number of credits due to the award.

It should thus be appreciated that the present invention provide a gaming device including a plurality of first components, a plurality of second components, and an outcome such an award adapted to be provided to a player based on at least one of the first components and at least one of the second components, wherein the outcome such as the award is determined by a selection of the first component from the plurality of first components and a selection of the second component from the one or a plurality of second components which are associated with the selected first component. In one further embodiment, the second component modifies the selected first component. The determinations can be random or otherwise suitably determined. In alternative embodiments, the first components can be suitably weighted, the first components and second components can be suitably weighted, or the second components can be suitably weighted. The weighting can be associated with the value of the components. In one such embodiments, the higher the value of the component, the lower the likelihood of selection. It should also be appreciated that the present invention enables the first components to share one or more components with one or more other first components, to share different components with different first components and to not share components.

It should also be appreciated that in one embodiment, the present invention provides a rotatable object having a plurality of sections which indicate the outcomes, where not every section can be indicated. In the embodiment illustrated and discussed below, only every other section (i.e., the sections with the first components as the values) can be indicated. It should also be appreciated that the first and second components such as the values and the multipliers can both depend on the same selected location, position or section such as a section of a wheel, reel or other object.

It is therefore and advantage of the present invention to provide a fun and exciting gaming device display for a wagering gaming device.

It is another advantage of the present invention to provide a game having an award that is based on multiple related components.

It is a further advantage of the present invention to provide award components that have unique associated sets of second components, which in one embodiment modify the first components.

Moreover, it is an advantage of the present invention to provide a gaming device display that can be implemented electromechanically or in a simulated manner.

Additional features and advantages of the present invention are described in, and will be apparent from, the following Detailed Description of the Invention and the figures.

DETAILED DESCRIPTION OF THE INVENTION

General

Figure 1A:
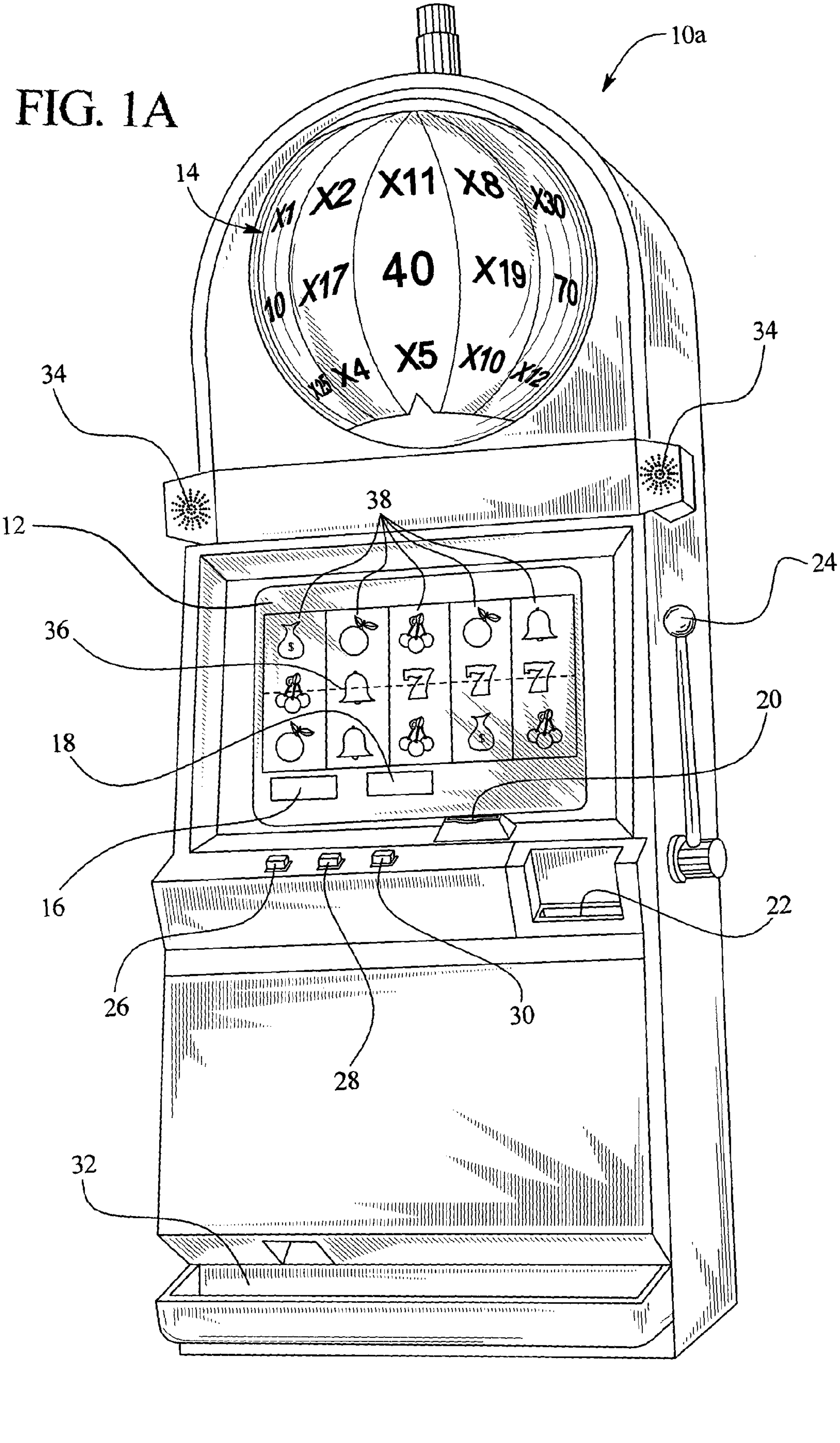
FIGS. 1A and 1B are front perspective views of various embodiments of a slot machine embodiment of the gaming device of the present invention.
Figure 1B:
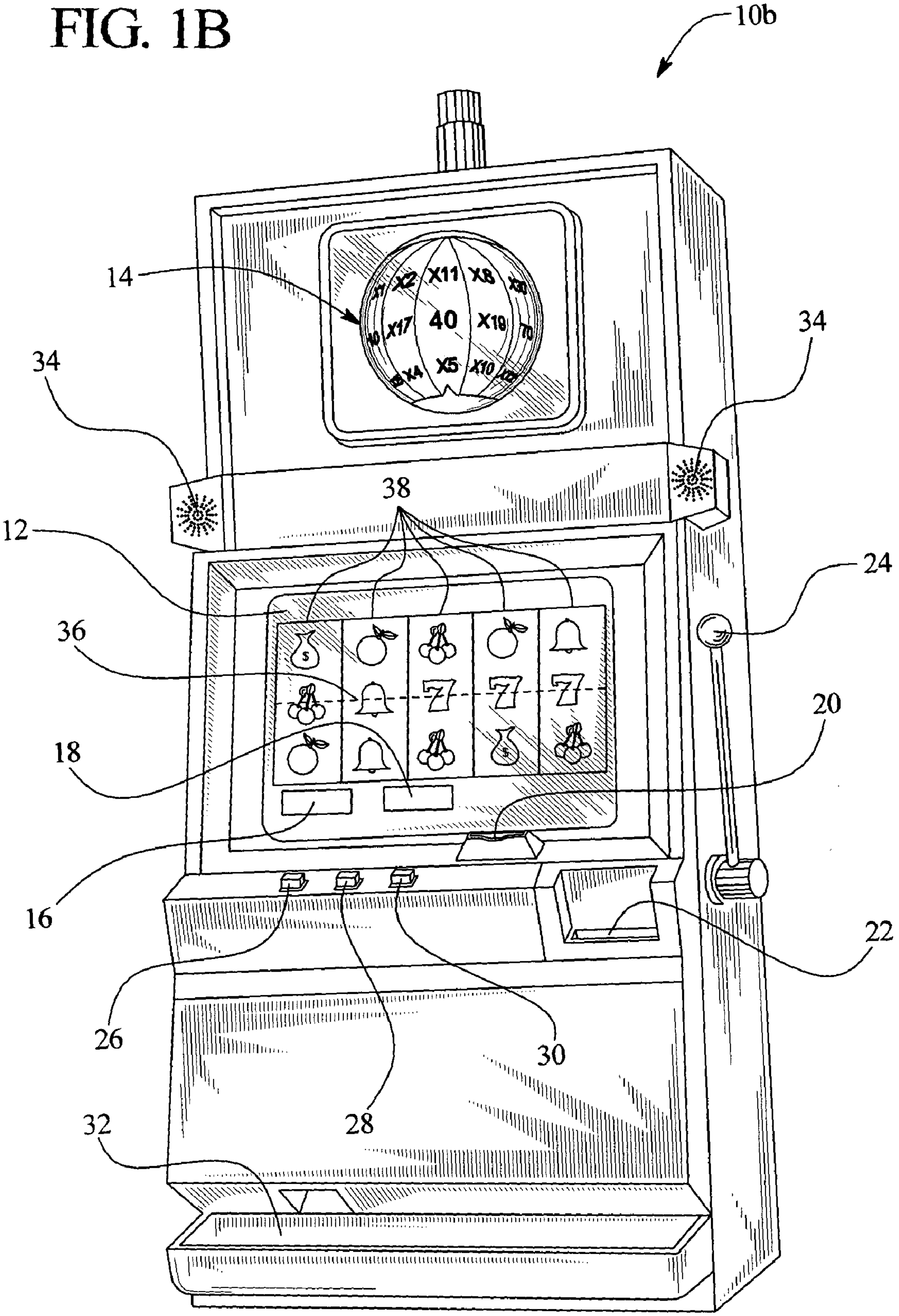

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. Gaming device 10 can be constructed with varying cabinet and display configurations, as illustrated by the different configurations shown in FIGS. 1A and 1B.

Figure 2A:
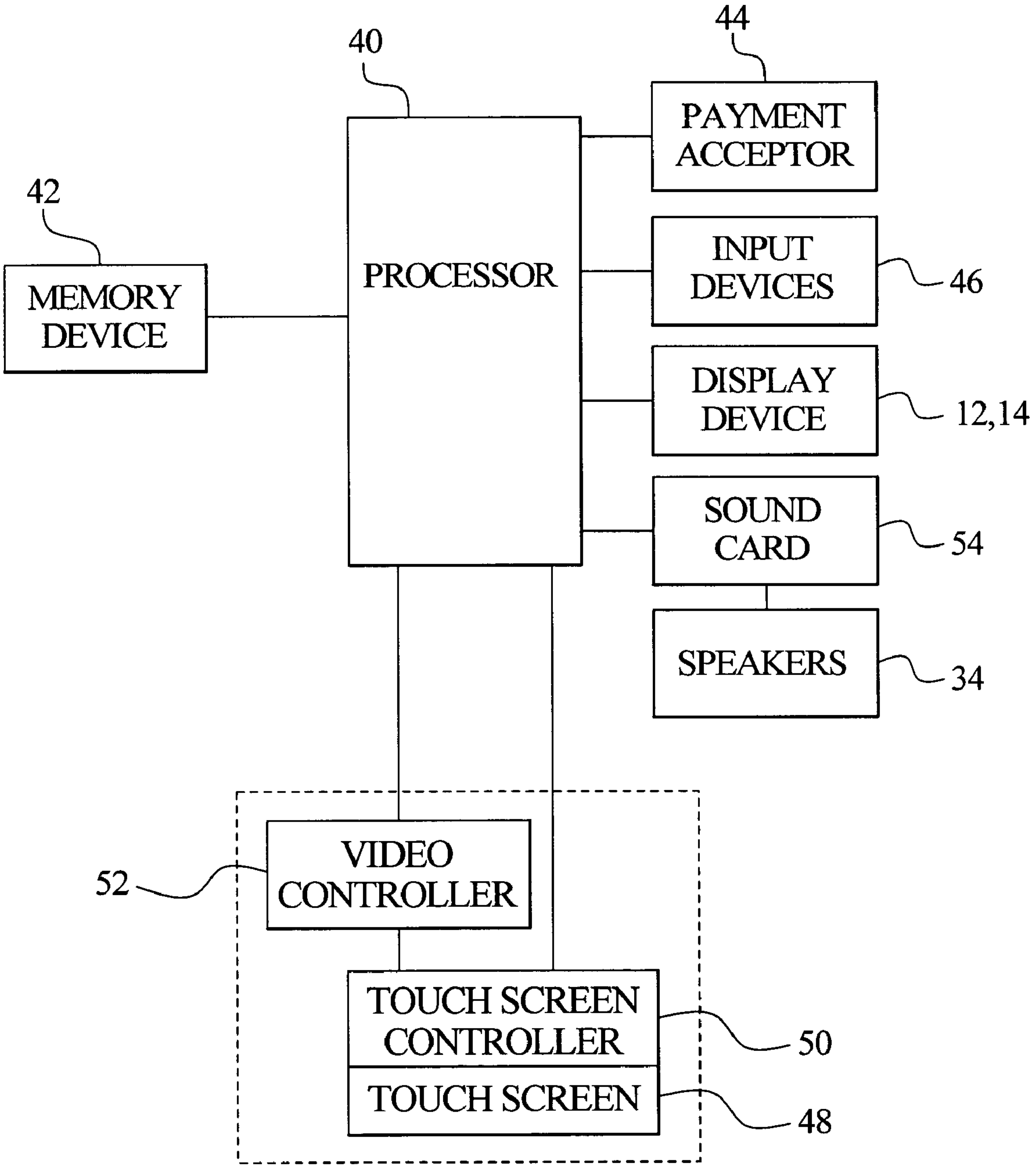
FIG. 2A is a schematic block diagram of the electronic configuration of one embodiment of the gaming device of the present invention.

In one embodiment, as illustrated in FIG. 2A, the gaming device includes at least one processor 40, such as a microprocessor, a microcontroller-based platform, a suitable integrated circuit or one or more application-specific integrated circuits (ASIC's). The processor is in communication with or operable to access or to exchange signals with at least one data storage or memory device 42. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, gaming device 10 includes one or more display devices controlled by the processor. The display devices are preferably connected to or mounted to the cabinet of the gaming device. The embodiment shown in FIG. 1A includes a central display device 12 which displays a primary game. This display device may also display any suitable secondary game associated with the primary game as well as information relating to the primary or secondary game. The alternative embodiment shown in FIG. 1B includes a central display device 12 and an upper display device 14. The upper display device may display the primary game, any suitable secondary game associated with the primary game and/or information relating to the primary or secondary game. As seen in FIGS. 1A and 1B, in one embodiment, the gaming device includes a credit display 16 which displays a player's current number of credits, cash, account balance or the equivalent. In one embodiment, the gaming device includes a bet display 18 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display a multitude of games or other suitable images, symbols and indicia, such as any visual representation or exhibition of the movement of objects, such as mechanical, virtual or video reels and wheels, dynamic lighting, video images and images of people, characters, places, things and faces of cards, tournament advertisements, promotions and the like.

In one alternative embodiment, the symbols, images and indicia displayed on or by the display device may be in mechanical form. That is, the display device may include any suitable electromechanical device which preferable moves one or more mechanical objects, such as one or more mechanical rotatable wheels, reels or dice, configured to display at least one and preferably a plurality of games or other suitable images, symbols or indicia.

As illustrated in FIG. 2A, in one embodiment, the gaming device includes at least one payment acceptor 44 in communication with the processor. As seen in FIGS. 1A and 1B, the payment acceptor may include a coin slot 20 and a payment, note or bill acceptor 22, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 46 in communication with the processor. The input devices can include any suitable device which enables the player to produce an input signal which is read by the processor. In one embodiment, after appropriate funding of the gaming device, the input device is a game activation device, such as a pull arm 26 or a play button 26 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 28. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 30. The player may push the cash out button and cash out to receive a cash payment or other suitable form of payment corresponding to the number of remaining credits. In one embodiment, when the player cashes out, the player receives the coins or tokens in a coin payout tray 32. In one embodiment, when the player cashes out, the player may receive other payout mechanisms such as tickets or credit slips which are redeemable by a cashier or funded to the player's electronically recordable identification card.

In one embodiment, as mentioned above and seen in FIG. 2A, one input device is a touch-screen 48 coupled with a touch-screen controller 50, or some other touch-sensitive display overlay to allow for player interaction with the images on the display. The touch-screen and the touch-screen controller are connected to a video controller 52. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 54 which function in conjunction with the processor. In one embodiment, the sound generating device includes at least one and preferably a plurality of speakers 34 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 36. The paylines may be horizontal, vertical, circular, diagonal, angled or any combination thereof. In this embodiment, the gaming device displays at least one reel and preferably a plurality of reels 38, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
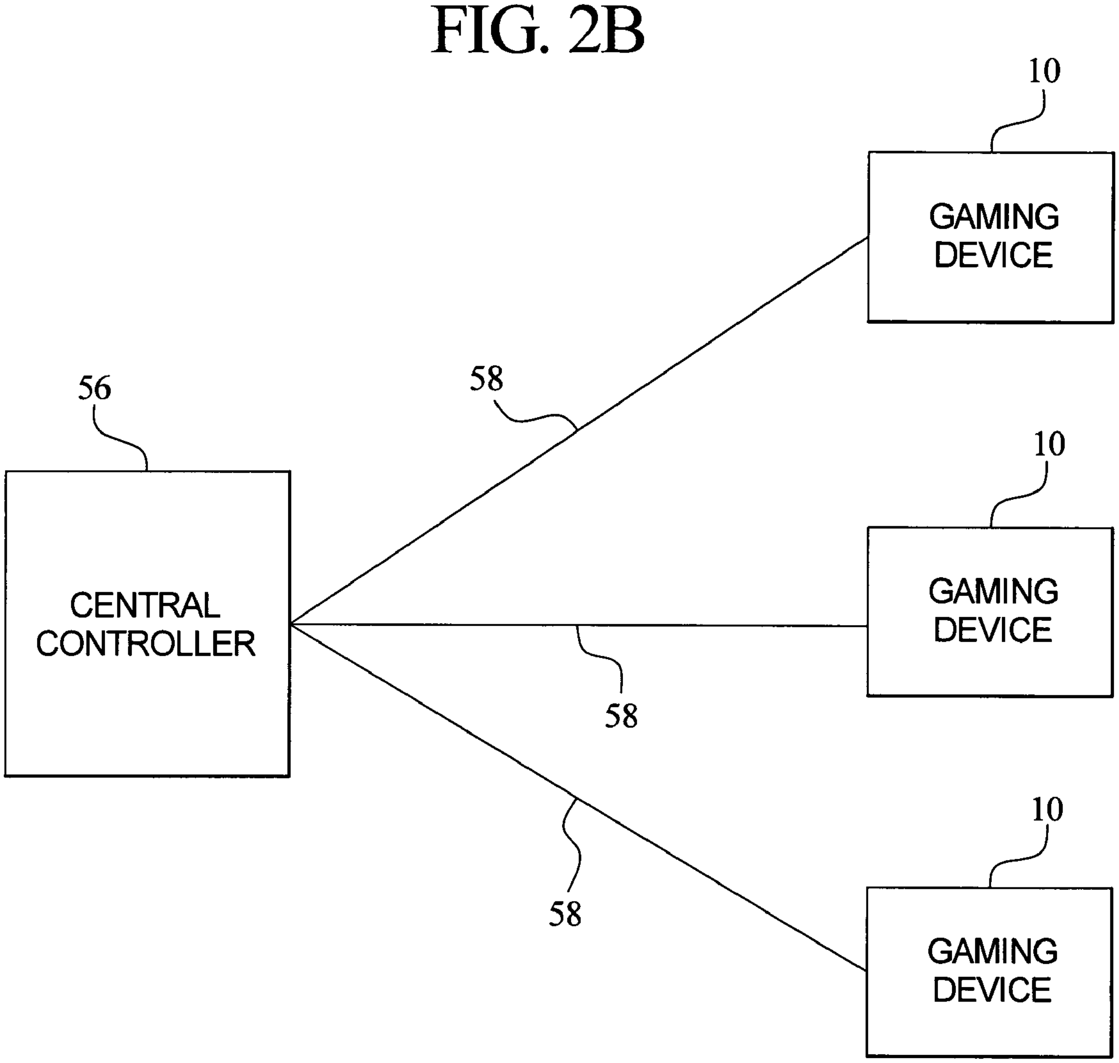
FIG. 2B is a schematic block diagram of various gaming devices employing the game of the present invention, wherein the devices are networked to a central controller.

In one embodiment, as illustrated in FIG. 2B, one or more of the gaming devices 10 of the present invention may be connected to a data network or a remote communication link 58 with some or all of the functions of each gaming device provided at a central location 56 such as a central server or controller. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

First and Second Components

Figure 3:
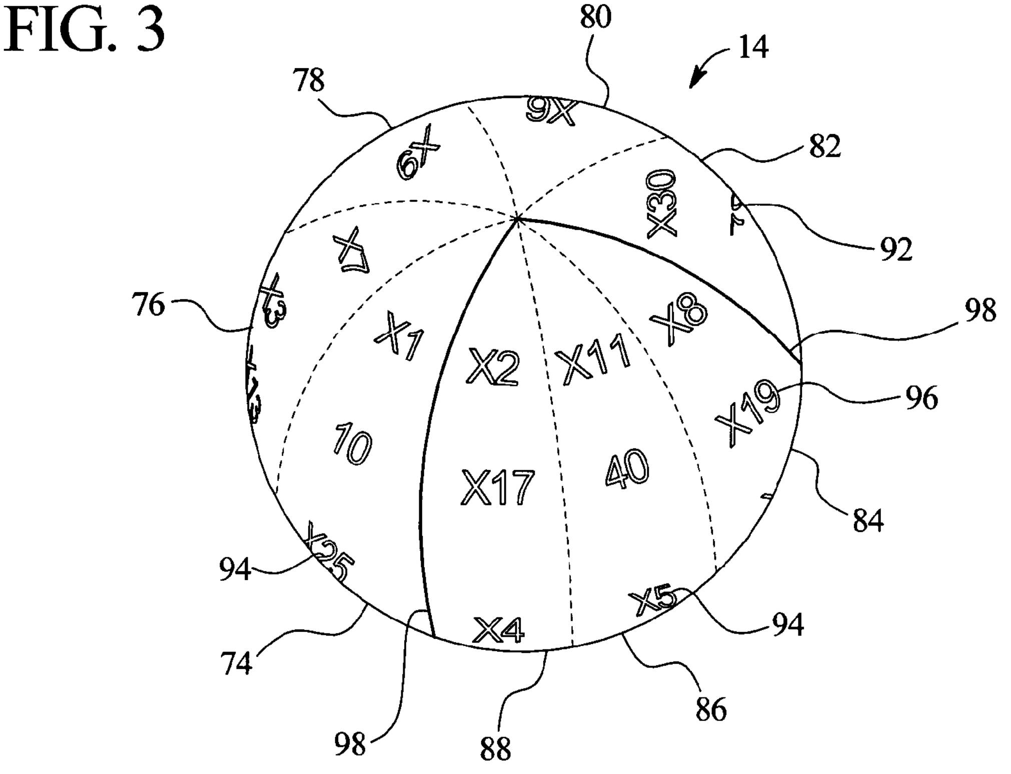
FIG. 3 is a perspective view of one embodiment of the award display of the present invention removed from the housing of the gaming device.

Referring now to FIGS. 1A, 1B and 3, one embodiment of a display 14 used in connection with a wagering gaming device of the present invention is illustrated. Display device 14 in one embodiment includes an electromechanical spherical object as illustrated and therefore operates in three dimensions. Any of the embodiments disclosed herein can alternatively be implemented using other suitable mechanical devices or virtually on a display device, such as video monitor 12. In the illustrated embodiment, the display device 14 includes a plurality of sections, wedges or slices 74, 76, 78, 80, 82, 84, 86 and 88. The sections can be distinguished visually in any of a number of suitable ways, such as via lines or bars dividing the slices, different colors, lighted versus non-lighted, different patterns and any combination thereof.

Sections 74, 78, 82 and 86 each display a first component such as a value 92 and a pair of second components such as multipliers 94. As illustrated, in one embodiment each of the sections displays the value 92 between two multipliers 94. Alternative arrangements and amounts of multipliers 94 and values 92 may be employed in accordance with the present invention. Sections 76, 80, 84 and 88 each display a plurality of second components such as a multipliers 96. In the illustrated embodiment, each section displays three multipliers 96, however, any suitable number is contemplated. As discussed above, the term "multiplier" is used herein for convenience. The term "multiplier" expressly includes any type of mathematical operator or modifier such as addition, addition in combination with multiplication or any other desired mathematical operation between the value and multiplier.

FIG. 3 illustrates a continuous display having alternating sections that display a first component such value 92 surrounded by two second components such as multipliers 94 and six second components such as multipliers 96. Multipliers 94 can be referred to as unique to, exclusive to or only associated with one particular value 92. Multipliers 96 are related to or associated with two of the values 92.

The configuration of the values 92 and multipliers 94 and 96 of display 14 creates an arrangement having a plurality of central value 92 each surrounded by a set of multipliers 94 and 96. One of those sets of multipliers is highlighted by dark solid lines 98 in FIG. 3. The multiplier set includes the multipliers 94 of X11 and X5. The multiplier set includes the multipliers 96 of X4, X17, X2, X11, X8, X19 and a multiplier that is not visible but which resides on the lower portion of section 84. That set of second components is associated with or exclusive to the value 92 of forty. However, in that set of second components, only modifiers 94 are exclusive to the value 92 of forty. That is, multipliers 96 of X2, X17 and X4 are also part of another exclusive set of second components or multipliers for the value 92 of ten. Likewise, multipliers 96 of X8, X19 and the hidden multiplier are part of the exclusive set of multipliers for the value 92 of section 82. Thus, while the sets of multipliers in display 14 are exclusive to one of the values 92, the multipliers within the sets may or may not be exclusive, depending on their location relative to the values 92.

In other words, each of the first components which are values in 92 in this illustrated embodiment has an associated set of second components which are multipliers 94 and 96. The multipliers 94 are not shared by another value and the multipliers 96 are each shared by another value (i.e., the values to be left and right of the value).

Figure 3A:
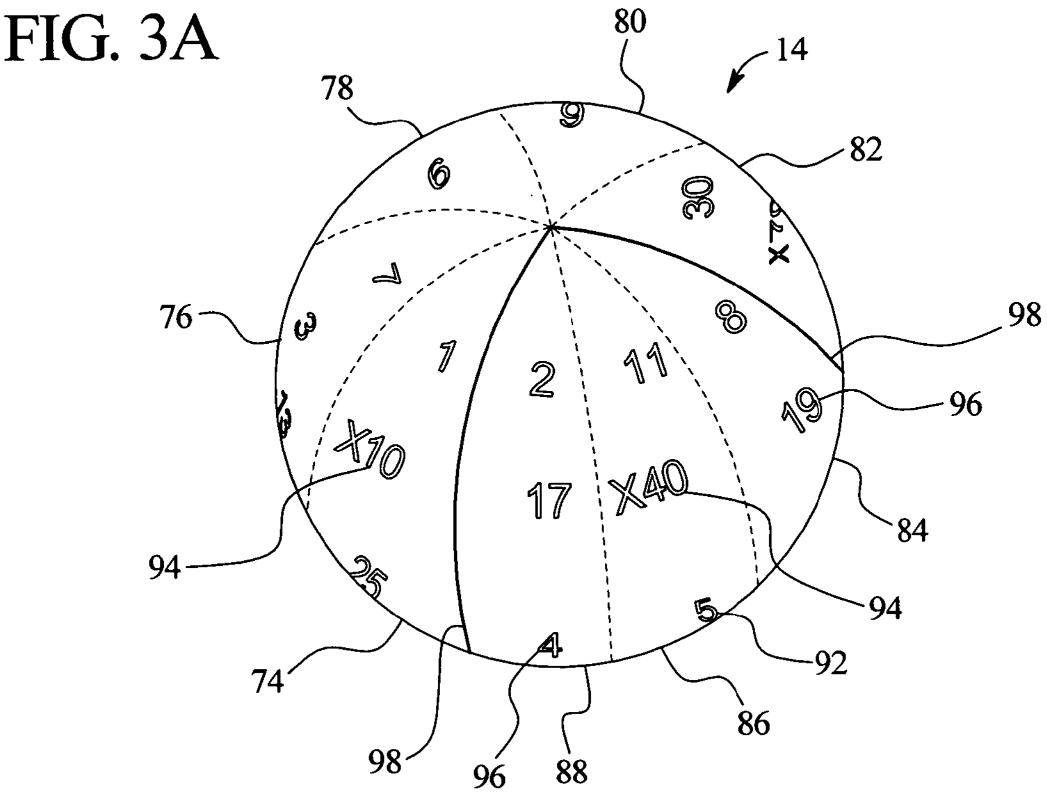
FIG. 3A is a perspective view of another embodiment of the award display of the present invention removed from the housing of the gaming device.

A number of alternative embodiments are possible for the display device. In one alternative embodiment, the rows of the first components or values and second components or multipliers are reversed, wherein a multiplier is surrounded by a set of values as illustrated in FIGS. 3A and 4A. FIGS. 3A and 4A illustrate a continuous display having alternating sections that display a second component such as multiplier 94 surrounded by two first components such as values 92 and six first components such as values 96. Display 114 of FIG. 4A differs from display 14 of FIG. 3A primarily in that each segment including a multiplier 94 is separated from the next adjacent segment containing a multiplier 94 by two segments having values 92. The multipliers 94 are also surrounded by the values 92 that reside within the same segment as the multipliers 94. In another alternative embodiment, the sections include different amounts of values and/or multipliers. For example, section 86 could include a plurality of values 92. Section 88 could include four or more or two or less multipliers. In a further embodiment, different suitable types of award or outcome components other than numerical components are displayed. For example, a meal or other type of non-monetary prize could be displayed.

In a further alternative embodiment, the display device 14 is operable to spin about a non-vertical axis, such as an angled axis or a substantially horizontal axis. The present invention also contemplates multiple display devices such a globe for each value 92 or multipliers 94 or 96 wherein each globe displays a set of multipliers, a set of values or a set of multipliers and values.

Figure 4:
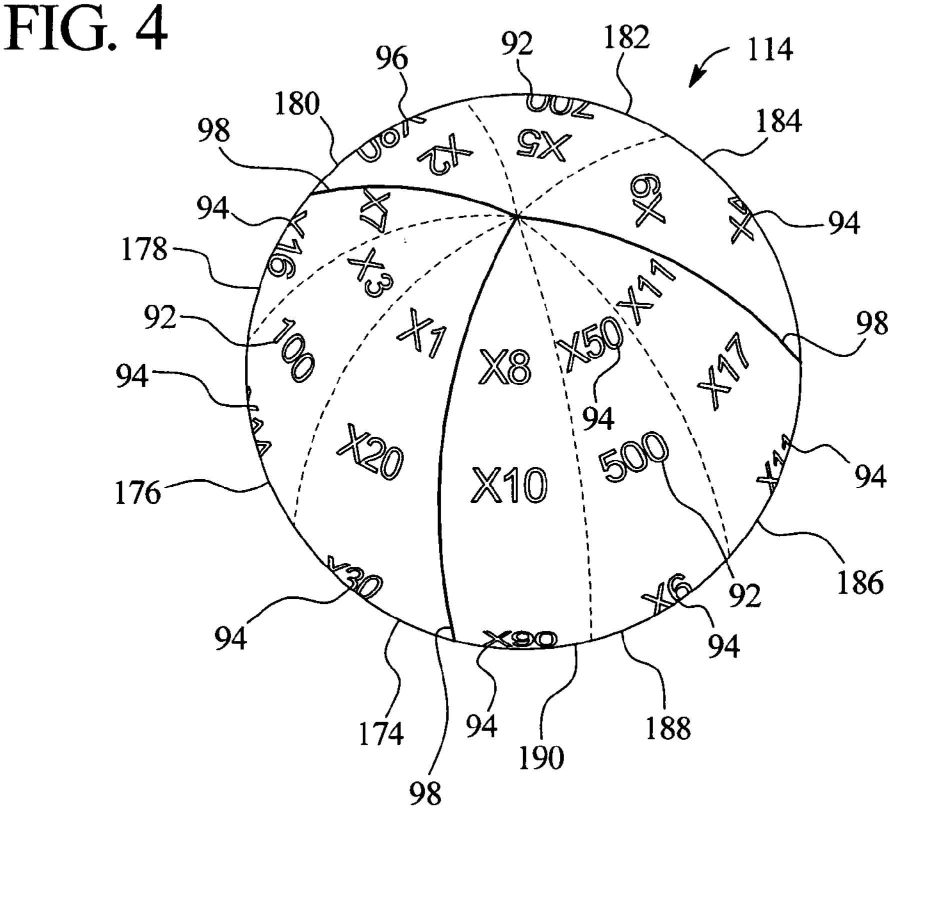
FIG. 4 is a perspective view of another embodiment of the award display of the present invention removed from the housing of the gaming device.
Figure 4A:
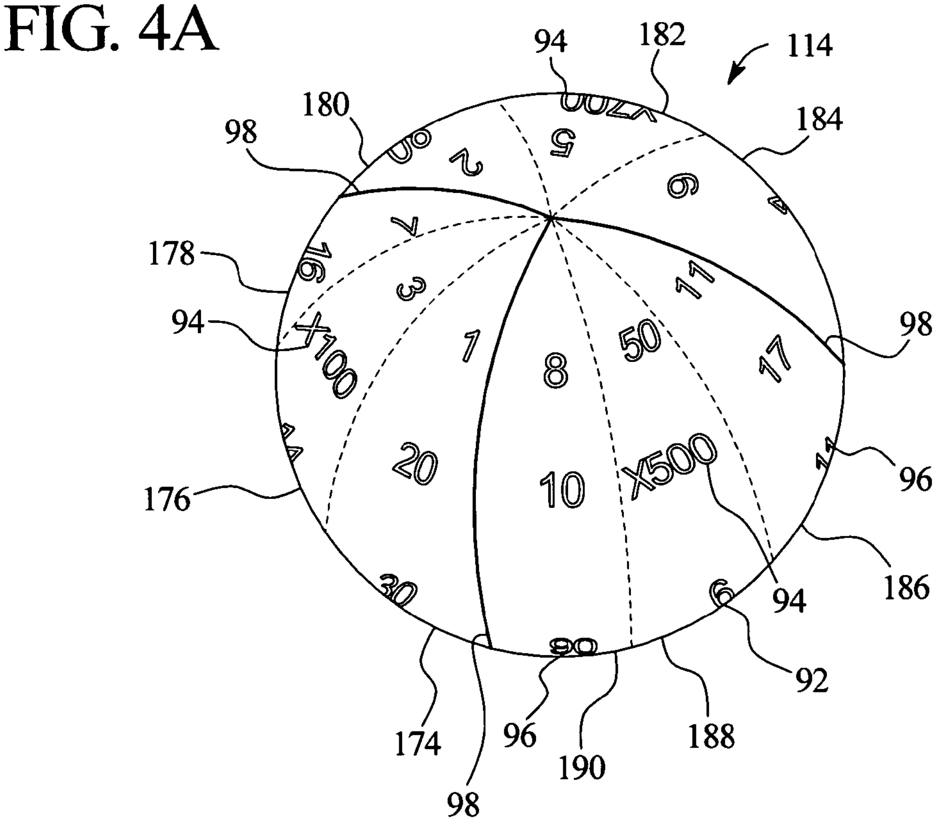
FIG. 4A is a perspective view of another embodiment of the award display of the present invention removed from the housing of the gaming device.

Referring now to FIG. 4, an alternative display device 114 is illustrated. Display device 114 is electromechanical or simulated as described above. Each of the alternative embodiments described above for the display 14 of FIG. 3 is applicable and incorporated by reference into the description of the display 114 of FIG. 4. Display 114 includes an extra multiplier only section or segment with respect to the arrangement of the display 14 of FIG. 3 and an overall additional section (i.e., nine versus eight).

Display 114 includes segments 174, 176, 178, 180, 182, 184, 186, 188 and 190. Display 114 differs from display 14 primarily in that each segment including a value 92 is separated from the next adjacent segment containing a value 92 by two segments having multipliers 94. The values 92 are also surrounded by the multipliers 94 that reside within the same segment as the values 92. Display 114 does not therefore include the shared multipliers 96 as discussed above in FIG. 3.

Bold lines 98 highlight and separate three separate sets of multipliers that are each associated with a value 92. The separate sets of multipliers are also exclusive or unique with respect to each other in the display 114 in FIG. 4. That is, no multiplier from any set is shared with any other set.

Both displays 14 and 144 include internal or external lights or a video display or some other way of designating sequentially one of the multipliers from each of the sets. In operation, the globe-like displays 14 or 114 spin until one of the values 92 is indicated, for example, by an arrow 192 placed above and/or below the displays as seen in FIG. 1B.

Display devices 14 and 114 can be made of any suitable material. The globe-like display devices 14 and 114 include in one embodiment a shaft (not illustrated) that extends through at least one of the upper and lower polar ends, where the sections begin and terminate. That shaft is controlled via a stepper motor or other type of motion producing device that controls the acceleration, velocity, rotational distance and direction of the spin of the display devices 14 and 114. When the display devices are simulated, the above-described equipment is not needed.

In one embodiment, the player's outcome is determined before or during the spin of the display devices 14 and 114, wherein the display devices stop rotating to indicate a randomly or otherwise predetermined one of the values 92. The spinning of the display devices can include motion profiles that vary from game to game or from game play to game, play and that include multiple direction changes, multiples speeds, etc.

Once the rotation of the display devices 14 and 114 stops, the multipliers 94 and 96 of display device 14 and the multipliers 94 of display 114 are illuminated or otherwise highlighted sequentially or collectively until one or a plurality of the multipliers is ultimately indicated and provided to the player. In one preferred embodiment, only a single multiplier remains highlighted and is therefore indicated. The player's overall award is then the multiplication of the multiplier by the value. In an alternative embodiment, multiple values 92 are highlighted and provided to the player.

Figure 5:
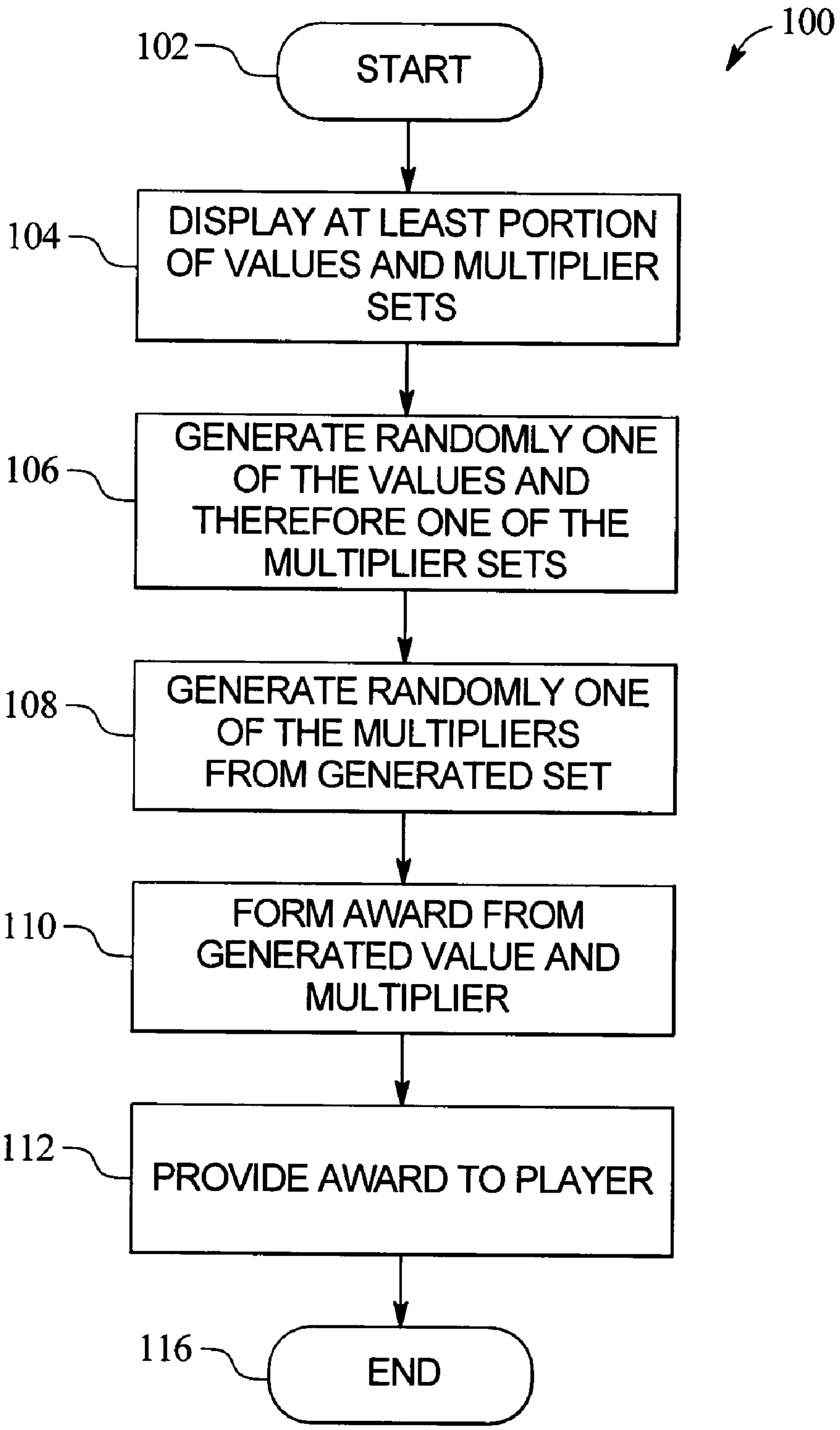
FIG. 5 is a flow diagram illustrating one possible sequence of events for the game employing the award display of the present invention.

Referring now to FIG. 5, a method 100 illustrates one possible sequence of operation for the globes 14 and 114 of the present invention. Upon starting a sequence, as indicated by oval 102, gaming device 10 displays in either a electromechanical or simulated format at least a portion of the values and multiplier sets, as indicated by block 104. Next, one of the values and therefore one of the multiplier sets is generated such as randomly or otherwise, as indicated by block 106. That is, regardless of whether display device 14 or 114 is implemented, the choice of a particular value 92 automatically designates the set of multipliers associated with the chosen value. In the display device 14, a portion of those multipliers also belong to a set associated with a different value.

Next, one of the multipliers is generated randomly or otherwise from the set of multipliers associated with the value. As discussed above, the generation may take place well before the actual display of the multiplier. "Generate" as it is used in block 108, includes to the apparent generation of the multiplier as seen by the player.

An award is then formed from the generated value and multiplier. As discussed above, constituent amounts of the value and multiplier can be multiplied, added or combined together via a plurality of various mathematical operators. Gaming device provides the award formed to the player. In one embodiment, the award is a number of gaming device credits. In another embodiment, the award itself is a modifier that modifies some number of credits maintained by the player, such as the player's wager, the player's bet, the player's wager per payline, etc. Still further, the award can be a number of picks from a prize pool, an increment of a progressive meter, a number of free spins, a number of free games and any combination thereof. After providing the award to the player, the sequence ends, as indicated by oval 116. The award or outcome can be any suitable award or outcome to provide to the player. If globes are used in a bonus game, the player returns to base game play of one of the base games discussed above.

It should thus be appreciated that the present invention provides an award that is displayed by selecting first and second components that are spatially related and then associated to form the award. The present invention further contemplates a method of indicating different components of an award that are located in the "same spatial arrangement, where the spatial arrangement determines the relationship of the second components to the first components.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device operated under control of a processor, said gaming device comprising:

a game operable upon a wager by a player;

a plurality of first components;

a plurality of sets of second components, each set of second components having a predetermined relationship with one of the first components, and each of the first components having a predetermined relationship with one of the sets of second components, wherein a first one of the first components has a first predetermined relationship with a first set of second components, a second one of the first components simultaneously has a second predetermined relationship with a second set of second components, and the first set of second components is different from the second set of second components;

an award adapted to be provided to the player and based on:

(a) one of the first components generated from the plurality of first components, and (b) one of the second components generated from one of the sets of second components having a predetermined relationship with the generated first component; and at least one display device controlled by the processor and operable to display the first components, the sets of second components and the award, wherein said at least one display device simultaneously displays:

(i) said first predetermined relationship, (ii) the second predetermined relationship, (iii) the first one of the first components, and (iv) the second one of the first components.

2. The gaming device of claim 1, wherein two sets of second components share at least one second component.

3. The gaming device of claim 1, wherein each of the sets of second components shares at least one second component with at least one other set of second components.

4. The gaming device of claim 1, wherein a first one of the sets of second components shares a first one of the second components with a second set of second components and shares a second one of the second components with a third set of the second components.

5. The gaming device of claim 1, wherein at least one of the sets of second components includes at least one second component that is not shared by any other set of second components.

6. The gaming device of claim 1, wherein the first components are values and the second components are multipliers.

7. The gaming device of claim 1, wherein the first components are multipliers and the second components are values.

8. The gaming device of claim 1, wherein the award is formed from a randomly generated first component from the plurality of first components.

9. The gaming device of claim 8, wherein the award is formed from a randomly generated second component from the set of second components having a predetermined relationship with the randomly generated first component.

10. The gaming device of claim 1, wherein the award is formed from a randomly generated second component from the set of second components having a predetermined relationship with the generated first component.

11. The gaming device of claim 1, wherein the award is formed by the generated second component modifying the generated first component.

12. The gaming device of claim 1, wherein the display device is adapted to display the predetermined relationships of the sets of second components with the first components.

13. The gaming device of claim 1, wherein the display device includes a mechanical substantially spherical shaped object.

14. The gaming device of claim 1, wherein the game is controlled via a data network or a computer storage device.

15. The gaming device of claim 14, wherein the data network includes an internet.

16. A gaming device operated under control of a processor, said gaming device comprising:

a game operable upon a wager by a player;

a plurality of first components;

a plurality of sets of second components, each set of second components having a predetermined relationship with one of the first components, each of the first components having a predetermined relationship with one of the sets of second components, at least one of the sets of second components sharing at least one second component with at least one other set of second components, and at least one of the sets of second components including at least one second component that is not shared by any other set of second components, wherein a first one of the first components has a first predetermined relationship with a first set of second components, a second one of the first components simultaneously has a second predetermined relationship with a second sets of second components, and the first set of second components is different from the second set of second components;

an award adapted to be provided to the player and based on:

(a) one of the first components generated from the plurality of first components, and (b) one of the second components generated from one of the sets of second components having a predetermined relationship with the generated first component; and at least one display device controlled by the processor and operable to display the first components, the sets of second components and the award, wherein said at least one display device simultaneously displays:

(i) said first predetermined relationship, (ii) the second predetermined relationship, (iii) the first one of the first components, and (iv) the second one of the first components.

17. The gaming device of claim 16, wherein each of the sets of second components shares at least one second component with at least one other set of second components.

18. The gaming device of claim 16, wherein a first one of the sets of second components shares a first one of the second components with a second set of second components and shares a second one of the second components with a third set of the second components.

19. The gaming device of claim 16, wherein the first components are values and the second components are multipliers.

20. The gaming device of claim 16, wherein the first components are multipliers and the second components are values.

21. The gaming device of claim 16, wherein the award is formed from a randomly generated first component from the plurality of first components.

22. The gaming device of claim 21, wherein the award is formed from a randomly generated second component from the set of second components having a predetermined relationship with the randomly generated first component.

23. The gaming device of claim 16, wherein the award is formed from a randomly generated second component from the set of second components having a predetermined relationship with the generated first component.

24. The gaming device of claim 16, wherein the award is formed by the generated second component modifying the generated first component.

25. The gaming device of claim 16, wherein the display device is adapted to display the predetermined relationships of the sets of second components with the first components and the shared and non-shared second components.

26. The gaming device of claim 16, wherein the game is controlled via a data network or a computer storage device.

27. The gaming device of claim 26, wherein the data network includes an internet.

28. A gaming device operable under control of a processor, said gaming device comprising:

a game operable upon a wager by a player;

a plurality of first components;

a plurality of sets of second components, each set of second components having a predetermined relationship with one of the first components, and each of the first components having a predetermined relationship with one of the sets of second components, wherein a first one of the first components has a first predetermined relationship with a first set of second components, a second one of the first components simultaneously has a second predetermined relationship with a second set of second components, and the first set of second components is different from the second set of second components;

an award adapted to be provided to the player based on at least one selected first component and at least one selected second component, said selected first component being selected from the plurality of first components and said selected second component being selected from the sets of second components having a predetermined relationship with said selected first component, and wherein the selected second component modifies the selected first component to form the award; and at least one display device controlled by the processor and operable to display the first components, the sets of second components and the award, wherein said at least one display device simultaneously displays:

(i) said first predetermined relationship, (ii) the second predetermined relationship, (iii) the first one of the first components, and (iv) the second one of the first components.

29. The gaming device of claim 28, wherein one of the second components has a predetermined relationship with two of the first components.

30. The gaming device of claim 28, wherein at least one of the second components has a predetermined relationship with only one of the first components.

31. The gaming device of claim 28, wherein the first components are values and the second components are multipliers.

32. The gaming device of claim 28, wherein the first components are multipliers and the second components are values.

33. The gaming device of claim 28, wherein the award is formed from a randomly selected first component from the plurality of first components.

34. The gaming device of claim 33, wherein the award is formed from a randomly selected second component from the set of second components having a predetermined relationship with the randomly selected first component.

35. The gaming device of claim 28, wherein the award is formed from a randomly selected second component from the set of second components having a predetermined relationship with the selected first component.

36. The gaming device of claim 28, wherein the display device is adapted to display the predetermined relationships of the sets of second components with the first components.

37. The gaming device of claim 28, wherein the game is controlled via a data network or a computer storage device.

38. The gaming device of claim 37, wherein the data network includes an internet.

39. A method of operating a gaming device having a game operable upon a wager by a player, said method comprising:

displaying a plurality of first components;

displaying a plurality of sets of second components, wherein each set of second components has a predetermined relationship with one of the first components, and wherein each of the first components includes a predetermined relationship with one set of second components;

displaying simultaneously (i) a predetermined relationship between a first one of the first components and a first set of second components, (ii) a predetermined relationship between a second one of the first components and a second set of second components, wherein the first set of second components and the second set of second components are different, (iii) the first one of the first components, and (iv) the second one of the first components;

generating one of the first components from the plurality of first components;

generating one of the second components from one of the sets of second components having a predetermined relationship with the generated first component;

determining an award based on the generated first component and the generated second component; and providing said award to the player.

40. The method of claim 39, wherein two sets of second components share at least one second component.

41. The method of claim 39, wherein each of the sets of second components shares at least one second component with at least one other set of second components.

42. The method of claim 39, wherein a first one of the sets of second components shares a first one of the second components with a second set of second components and shares a second one of the second components with a third set of the second components.

43. The method of claim 39, wherein at least one of the sets of second components includes at least one second component that is not shared by any other set of second components.

44. The method of claim 39, wherein the first components are values and the second components are multipliers.

45. The method of claim 39, wherein the first components are multipliers and the second components are values.

46. The method of claim 39, which includes randomly generating the first component from the plurality of first components.

47. The method of claim 46, which includes randomly generating the second component from the set of second components having a predetermined relationship with the randomly generated first component.

48. The method of claim 39, which includes randomly generating the second component from the set of second components having a predetermined relationship with the generated first component.

49. The method of claim 39, which includes forming the award by using the generated second component to modify the generated first component.

50. The method of claim 39, which includes displaying the predetermined relationships of the sets of second components with the first components.

51. The method of claim 39, which includes controlling the game via a data network or a computer storage device.

52. The method of claim 51, wherein the data network includes an internet.

53. A method of operating a gaming device having a game operable upon a wager by a player, said method comprising:

displaying a plurality of first components;

displaying a plurality of sets of second components, each set of second components having a predetermined relationship with one of the first components, and each of the first components having a predetermined relationship with one of the sets of second components, at least one of the sets of second components sharing at least one second component with at least one other set of second components, and at least one of the sets of second components including at least one second component that is not shared by any other set of second components;

displaying simultaneously (i) a predetermined relationship between a first one of the first components and a first set of second components, (ii) a predetermined relationship between a second one of the first components and a second set of second components, wherein the first set of second components and the second set of second components are different, (iii) the first one of the first components, and (iv) the second one of the first components;

generating one of the first components from the plurality of first components;

generating one of the second components from one of the sets of second components having a predetermined relationship with the generated first component;

determining an award based on the generated first component and generated second component; and providing said award to the player.

54. The method of claim 53, wherein each of the sets of second components shares at least one second component with at least one other set of second components.

55. The method of claim 53, wherein a first one of the sets of second components shares a first one of the second components with a second set of second components and shares a second one of the second components with a third set of the second components.

56. The method of claim 53, wherein the first components are values and the second components are multipliers.

57. The method of claim 53, wherein the first components are multipliers and the second components are values.

58. The method of claim 53, which includes randomly generating the first component from the plurality of first components.

59. The method of claim 58, which includes randomly generating the second component from the set of second components having a predetermined relationship with the randomly generated first component.

60. The method of claim 53, which includes randomly generating the second component from the set of second components having a predetermined relationship with the generated first component.

61. The method of claim 53, which includes forming the award by using the generated second component to modify the generated first component.

62. The method of claim 53, which includes displaying the predetermined relationships of the sets of second components with the first components and the shared and non-shared second components.

63. The method of claim 53, which includes controlling the game via a data network or a computer storage device.

64. The method of claim 63, wherein the data network includes an internet.

65. A method of operating a gaming device having a game operable upon a wager by a player, said method comprising:

displaying a plurality of first components;

displaying a plurality of sets of second components, each set of second components having a predetermined relationship with one of the first components, and each of the first components having a predetermined relationship with one of the sets of second components;

displaying simultaneously (i) a predetermined relationship between a first one of the first components and a first set of second components, (ii) a predetermined relationship between a second one of the first components and a second set of second components, wherein the first set of second components and the second set of second components are different, (iii) the first one of the first components, and (iv) the second one of the first components;

selecting one of the first components from the plurality of first components;

selecting one of the second components from the set of second components having a predetermined relationship with said selected first component;

forming an award based on the selected first component and the selected second component, wherein the second component modifies the selected first component; and providing the award to the player.

66. The method of claim 65, wherein one of the second components has a predetermined relationship with two of the first components.

67. The method of claim 65, wherein at least one of the second components has a predetermined relationship with one of the first components.

68. The method of claim 65, wherein the first components are values and the second components are multipliers.

69. The method of claim 65, wherein the first components are multipliers and the second components are values.

70. The method of claim 65, which includes randomly selecting the first component from the plurality of first components.

71. The method of claim 70, which includes randomly selecting the second component from the set of second components having a predetermined relationship with the randomly selected first component.

72. The method of claim 65, which includes randomly selecting the second component from the set of second components having a predetermined relationship with the selected first component.

73. The method of claim 65, which includes displaying the predetermined relationships of the sets of second components with the first components.

74. The method of claim 65, which includes controlling the game via a data network or a computer storage device.

75. The method of claim 74, wherein the data network includes an internet.

76. The gaming device of claim 1, wherein each first component has a predetermined relationship with only one set of second components.

77. The gaming device of claim 1, wherein each set of second components has a predetermined relationship with only one first component.

78. The gaming device of claim 16, wherein each first component has a predetermined relationship with only one set of second components.

79. The gaming device of claim 16, wherein each set of second components has a predetermined relationship with only one first component.

80. The gaming device of claim 28, wherein each first component has a predetermined relationship with only one set of second components.

81. The gaming device of claim 28, wherein each set of second components has a predetermined relationship with only one first component.

82. The method of claim 39, wherein each first component has a predetermined relationship with only one set of second components.

83. The method of claim 39, wherein each set of second components has a predetermined relationship with only one first component.

84. The method of claim 53, wherein each first component has a predetermined relationship with only one set of second components.

85. The method of claim 53, wherein each set of second components has a predetermined relationship with only one first component.

86. The method of claim 65, wherein each first component has a predetermined relationship with only one set of second components.

87. The method of claim 65, wherein each set of second components has a predetermined relationship with only one first component.

88. A gaming device operated under control of a processor, said gaming device comprising:

a game operable upon a wager by a player;

a plurality of first components;

a plurality of sets of second components, each set of second components having a predetermined relationship with one of the first components, and each of the first components having a predetermined relationship with one of the sets of second components, wherein a first one of the first components has a predetermined relationship with a first set of second components and simultaneously a second one of the first components has a predetermined relationship with a second set of second components, wherein the first set of second components includes a first one of the second components which is not in the second set of second components, and wherein the second set of second components includes a second one of the second component which is not in the first set of second components;

an award adapted to be provided to the player and based on:

(a) one of the first components generated from the plurality of first components, wherein the first one of the first components is eligible for generation when said generated first component is generated and the second one of the first components is eligible for generation when said generated first component is generated, and (b) one of the second components generated from one of the sets of second components having a predetermined relationship with the generated first component, wherein if said generated first component is the first one of the first components, said generated second component can be generated from the first set of second components, and wherein if said generated first component is the second one of the first components, said generated second component can be generated from the second set of second components; and at least one display device controlled by the processor operable to display the first components, the sets of second components and the award.

89. A gaming device operated under control of a processor, said gaming device comprising:

a game operable upon a wager by a player;

a plurality of first components;

a plurality of sets of second components, each set of second components having a predetermined relationship with one of the first components, each of the first components having a predetermined relationship with one of the sets of second components, at least one of the sets of second components sharing at least one second component with at least one other set of second components, a first one of the sets of second components including a first one of the second components that is not shared by any other set of second components, and a second one of the sets of second components including a second one of the second components that is not shared by any other set of second components;

an award adapted to be provided to the player and based on:

(a) one of the first components generated from the plurality of first components, wherein a first one of the first components is eligible for generation when said generated first component is generated and a second one of the first components is eligible for generation when said generated first component is generated, and (b) one of the second components generated from one of the sets of second components having a predetermined relationship with the generated first component; and at least one display device controlled by the processor operable to display the first components, the sets of second components and the award, wherein the first one of the first components and the second one of the first components simultaneously (i) have a predetermined relationship with different sets of second components and (ii) are displayed with said different sets of second components by the at least one display device.

* * * * *